(12) United States Patent
Spire et al.

(10) Patent No.: US 8,504,679 B2
(45) Date of Patent: Aug. 6, 2013

(54) METHODS, SYSTEMS AND COMPUTER PROGRAM PRODUCTS FOR MANAGING EXECUTION OF INFORMATION TECHNOLOGY (IT) PROCESSES

(75) Inventors: Edward Spire, Houston, TX (US); Jiebo Guan, Missouri City, TX (US); Michael Sharpe, Houston, TX (US); Roberto Reiner, Cypress, TX (US); Mark Jones, Fall City, WA (US); Stephen Park, Cypress, TX (US)

(73) Assignee: NetIQ Corporation, Houston, TX (US)

( * ) Notice: Subject to any disclaimer, the term of this patent is extended or adjusted under 35 U.S.C. 154(b) by 1010 days.

(21) Appl. No.: 11/744,983

(22) Filed: May 7, 2007

(65) Prior Publication Data
US 2007/0266138 A1 Nov. 15, 2007

Related U.S. Application Data

(60) Provisional application No. 60/798,934, filed on May 9, 2006.

(51) Int. Cl.
*G06F 15/173* (2006.01)
*H04L 29/08* (2006.01)
*H04L 29/06* (2006.01)
*H04L 12/24* (2006.01)

(52) U.S. Cl.
CPC .......... *H04L 29/08072* (2013.01); *H04L 29/06* (2013.01); *H04L 41/0213* (2013.01)
USPC ............ 709/224; 709/223; 709/225; 709/226

(58) Field of Classification Search
USPC ................................. 709/223–226
See application file for complete search history.

(56) References Cited

U.S. PATENT DOCUMENTS

| 4,972,453 | A  | * | 11/1990 | Daniel et al. ................. 379/9.03 |
| 5,881,237 | A  |   | 3/1999  | Schwaller et al. |
| 6,032,184 | A  | * | 2/2000  | Cogger et al. ................ 709/223 |
| 6,249,755 | B1 | * | 6/2001  | Yemini et al. ................. 702/183 |
| 6,389,426 | B1 | * | 5/2002  | Turnbull et al. .............. 707/661 |
| 6,792,460 | B2 | * | 9/2004  | Oulu et al. .................... 709/224 |
| 6,957,257 | B1 | * | 10/2005 | Buffalo et al. ................ 709/224 |
| 7,093,251 | B2 | * | 8/2006  | Tsun et al. .................... 718/100 |
| 7,225,139 | B1 | * | 5/2007  | Tidwell et al. ............... 705/7.15 |
| 7,269,625 | B1 | * | 9/2007  | Willhide et al. ............. 709/206 |
| 7,305,465 | B2 | * | 12/2007 | Wing et al. ................... 709/223 |

(Continued)

OTHER PUBLICATIONS

Luc M. Gonzales, Ronald R. Giachetti, Guillermo Ramirez: "Knowledge management-centric help desk: specifcation and performance evaluation"; 2004, pp. 389-405, Elsevier, available online at www.sciencedirect.com.*

*Primary Examiner* — Catherine Thiaw
(74) *Attorney, Agent, or Firm* — Myers Bigel Sibley & Sajovec PA

(57) ABSTRACT

Methods, systems and computer program products are provided for managing information technology (IT) processes for a computer network. An incident report, including associated data, is received from an application monitoring resources on the computer network. Additional data associated with the computer network resources to be obtained based on the incident report is automatically identified and obtained. Related data in a historical database is automatically identified based on the incident report and/or the additional data and the identified related historical data is automatically retrieved. The incident report, the additional data and/or the related historical data are analyzed to identify a responsive process to respond to the incident report.

29 Claims, 11 Drawing Sheets

U.S. PATENT DOCUMENTS

| | | | |
|---|---|---|---|
| 7,469,287 B1* | 12/2008 | Castillo et al. | 709/224 |
| 7,647,391 B1* | 1/2010 | Jean et al. | 709/223 |
| 7,688,951 B1* | 3/2010 | Bajpay et al. | 379/9.03 |
| 7,730,172 B1* | 6/2010 | Lewis | 709/224 |
| 8,332,502 B1* | 12/2012 | Neuhaus et al. | 709/224 |
| 2001/0001143 A1* | 5/2001 | Jones et al. | 705/1 |
| 2003/0005107 A1* | 1/2003 | Dulberg et al. | 709/223 |
| 2005/0021736 A1* | 1/2005 | Carusi et al. | 709/224 |
| 2005/0021748 A1* | 1/2005 | Garcea et al. | 709/224 |
| 2005/0039192 A1* | 2/2005 | Chavez et al. | 719/318 |
| 2005/0235058 A1* | 10/2005 | Rackus et al. | 709/224 |
| 2006/0031478 A1* | 2/2006 | Gopalkrishnan et al. | 709/224 |
| 2006/0041660 A1* | 2/2006 | Bishop et al. | 709/224 |
| 2006/0095570 A1* | 5/2006 | O'Sullivan | 709/224 |
| 2006/0107088 A1* | 5/2006 | Katayama et al. | 714/4 |
| 2006/0112317 A1* | 5/2006 | Bartolini et al. | 714/47 |
| 2006/0245369 A1* | 11/2006 | Schimmelpfeng et al. | 370/252 |
| 2006/0277295 A1* | 12/2006 | Masuda et al. | 709/224 |
| 2007/0106768 A1* | 5/2007 | Frietsch et al. | 709/223 |
| 2007/0112947 A1* | 5/2007 | Anderson et al. | 709/223 |
| 2007/0124437 A1* | 5/2007 | Chervets | 709/223 |
| 2007/0192400 A1* | 8/2007 | Lee et al. | 709/202 |
| 2007/0233848 A1* | 10/2007 | Nastacio | 709/224 |

* cited by examiner

Related Incidents for Ticket #343075 — 710

Incident Summary

| | |
|---|---|
| Incident Name: | Poor response time on http://cashmgmt |
| Source of Incident: | AppManager, Event ID=23454 |
| Open Time: | 01/05/2006 5:24am |
| Service(s): | 720  Cash Management |
| Component(s): | HOUCASHRT01 |

730

Related Incidents

| Date | Service | Component | Type | Source | Confirm Relationship |
|---|---|---|---|---|---|
| 01/05/2006 5:00am  Expand database for cash management system (more) | Cash Management | HOUCASHDB01 | Change Request | Remedy | ☐ |
| 01/05/2006 5:13am  File CASHMGMTDB.MDB size increased from 12.9GB to 16.1GB (more) | Cash Management | HOUCASHWEB01 | Change | Tripwire | ☐ |
| 01/05/2006 5:22am  High disk utilization on drive f: (more) | Cash Management | HOUCASHDB01 | Perf & Availability | AppManager | ☐ |
| 01/05/2006 5:31am  Slow application performance reported by end user (more) | Cash Management | HOUCASHWEB01 | Helpdesk Ticket | Remedy | ☐ |
| 01/06/2006 6:07am  Non-compliant account found in Local Administrators group (more) | Cash Management | HOUCASHDB01 | New Vulnerability | Vulnerability Manager | ☐ |

METHODS, SYSTEMS AND COMPUTER PROGRAM PRODUCTS FOR MANAGING EXECUTION OF INFORMATION TECHNOLOGY (IT) PROCESSES

RELATED APPLICATION

This application claims the benefit of and priority to U.S. Provisional Patent Application No. 60/798,934, entitled "METHODS, SYSTEMS AND COMPUTER PROGRAM PRODUCTS FOR MANAGING EXECUTION OF INFORMATION TECHNOLOGY(IT) PROCESSES," filed May 9, 2006, the disclosure of which is hereby incorporated herein by reference as if set forth in its entirety.

BACKGROUND OF THE INVENTION

The present invention, generally, relates to computer networks and, more particularly, to methods, systems and computer program products for managing such computer networks.

Companies are often dependent on mission-critical network applications to stay productive and competitive. To achieve this, information technology (IT) organizations preferably provide reliable application performance on a 24-hour, 7-day-a-week basis. One known approach to network performance testing to aid in this task is described in U.S. Pat. No. 5,881,237 ("the 237 patent") entitled *Methods, Systems and Computer Program Products for Test Scenario Based Communications Network Performance Testing*. As described in the '237 patent, a test scenario simulating actual applications communication traffic on the network is defined. Various performance characteristics are measured while the test is executing. The resultant data may be provided to a console node, coupled to the network, which may also initiate execution of the test scenario by the various endpoint nodes.

Information technology processes may be primarily managed using, for example, ticketing systems. Having good visibility into several aspects of process execution may be difficult. Furthermore, the operation of an IT installation may require constant attention to exceptional conditions, for example, hardware and software failures, over-utilized resources and/or slow response times, in order to analyze these conditions. The analysis may determine the cause and effect of the exceptional conditions and address these conditions, so as to provide continued service delivery. Many of the manual steps used may be routine, and executing them manually may be a waste of expensive human resources. In other cases, understanding of the causes and effects of exceptional conditions may be present in the organization, but not currently in hand, so duplication of effort in the analysis of these conditions may occur, which may also waste expensive human resources.

SUMMARY OF THE INVENTION

Embodiments of the present invention provide methods for managing information technology (IT) processes for a computer network. An incident report, including associated data, is received from an application monitoring resources on the computer network. Additional data associated with the computer network resources to be obtained based on the incident report is automatically identified and obtained. Related data in a historical database is automatically identified based on the incident report and/or the additional data and the identified related historical data is automatically retrieved. The incident report, the additional data and/or the related historical data are analyzed to identify a responsive process to respond to the incident report.

In further embodiments, the computer network includes a plurality of applications monitoring resources on the computer network and automatically obtaining the identified additional data includes obtaining the additional data from different ones of the applications monitoring resources on the computer network. The plurality of applications monitoring resources may include an application manager, a security manager and/or a vulnerability manager and the incident report may be a violation of a service level agreement. Receiving an incident report may be followed by updating the historical database based on the incident report.

In other embodiments, analyzing the incident report may include providing the incident report, the additional data, the related historical data and/or the identified responsive process to a network administrator in a prioritized ordering based on an evaluation of the relevance of the additional data in view of the related historical data. Providing the incident report, the additional data, the related historical data and/or the identified responsive process to the network administrator may include generating a process dashboard graphical user interface (GUI). The GUI may include an identification of timeliness of provision of ones of the monitored resources relative to a corresponding benchmark, a breakdown of time spent in respective ones of a plurality of states associated with provision of the ones of the monitored resources, an identification of commonalities among the received incident report and other currently pending incident reports, a comparison of policy execution metrics over a selected period of time and/or a summary of accumulated data in the historical database including a correlation between initial indicators of incident causes and successful remediations, successful remediation instances, a level of usage of the accumulated data, a relation between the usage of the accumulated data and a performance measure of remediations and/or manually entered comments associated with remediation instances.

In further embodiments, the historical database includes a plurality of responsive processes associated with respective incident report types and a plurality of rules for identifying ones of the plurality of responsive processes based on the incident report and/or the additional data. Analyzing the incident report includes identifying at least one of the plurality of rules to be evaluated responsive to the received incident report and evaluating the identified at least one of the plurality of riles.

In yet other embodiments, analyzing the incident report includes determining if the identified responsive process includes an associated automated remediation process. The incident report, the additional data, the related historical data and/or the identified responsive process are provided to a network administrator in a prioritized ordering based on an evaluation of the relevance of the additional data in view of the related historical data when the identified responsive process does not include an associated automated remediation process. The associated automated remediation process is automatically executed when the identified responsive process does include an associated automated remediation process.

In further embodiments, analyzing the incident report is followed by determining an effectiveness of the identified responsive process in addressing the incident report and updating the historical database based on the effectiveness of the identified responsive process. Determining the effectiveness may include executing an automated network health check process for the computer network, the automated network health check process including obtaining data associated with a network resource identified in the incident report after the identified responsive process has been executed.

In other embodiments, the historical database includes a plurality of responsive processes associated with respective incident report types and a plurality of rules for identifying ones of the plurality of responsive processes based on the incident report and/or the additional data. Updating the historical database includes modifying at least one of the plurality of responsive processes that is associated with an incident report type of the received incident report and/or at least one of the plurality of rules based on the effectiveness of the identified responsive process. Identifying the related data in the historical database may include identifying an indicator for the received incident report and identifying data associated with previous incident reports in the historical database as related historical data based on the identified indicator, the related historical data including an identification of additional data obtained for the previous incident reports and its relevance in remediation of the previous incident reports and/or an identification of responsive processes used in remediation of the previous incident reports and their success in remediation of the previous incident reports.

In further embodiments, the identified responsive process includes a plurality of alternative responsive processes. Analyzing the incident report includes reporting the identification of additional data obtained for the previous incident reports and its relevance in remediation of the previous incident reports and the identification of responsive processes used in remediation of the previous incident reports and their success in remediation of the previous incident reports to a network administrator. A selection of one of the plurality of alternative responsive processes is received from the network administrator. Reporting the identification of additional data may include generating a process dashboard GUI.

In yet other embodiments, systems for managing IT processes for a computer network include a communication interface coupled to the computer network that is configured to receive an incident report, including associated data, from an application monitoring resources on the computer network. An additional data acquisition module is configured to identify additional data associated with the computer network resources to be obtained based on the incident report and to obtain the identified additional data. A historical data acquisition module is configured to identify related data in a historical database based on the incident report and/or the additional data and to retrieve the identified related historical data. A data analysis module is configured to analyze the incident report, the additional data and/or the related historical data to identify a responsive process to respond to the incident report. The systems may further include a user report generating module configured to provide the incident report, the additional data, the related historical data and/or the identified responsive process to the network administrator, including generating a process dashboard GUI.

BRIEF DESCRIPTION OF THE DRAWINGS

FIGS. 7-11 are graphical user interfaces (GUIs) according to some embodiments of the present invention.

DESCRIPTION OF EMBODIMENTS OF THE PRESENT INVENTION

Figure 1:
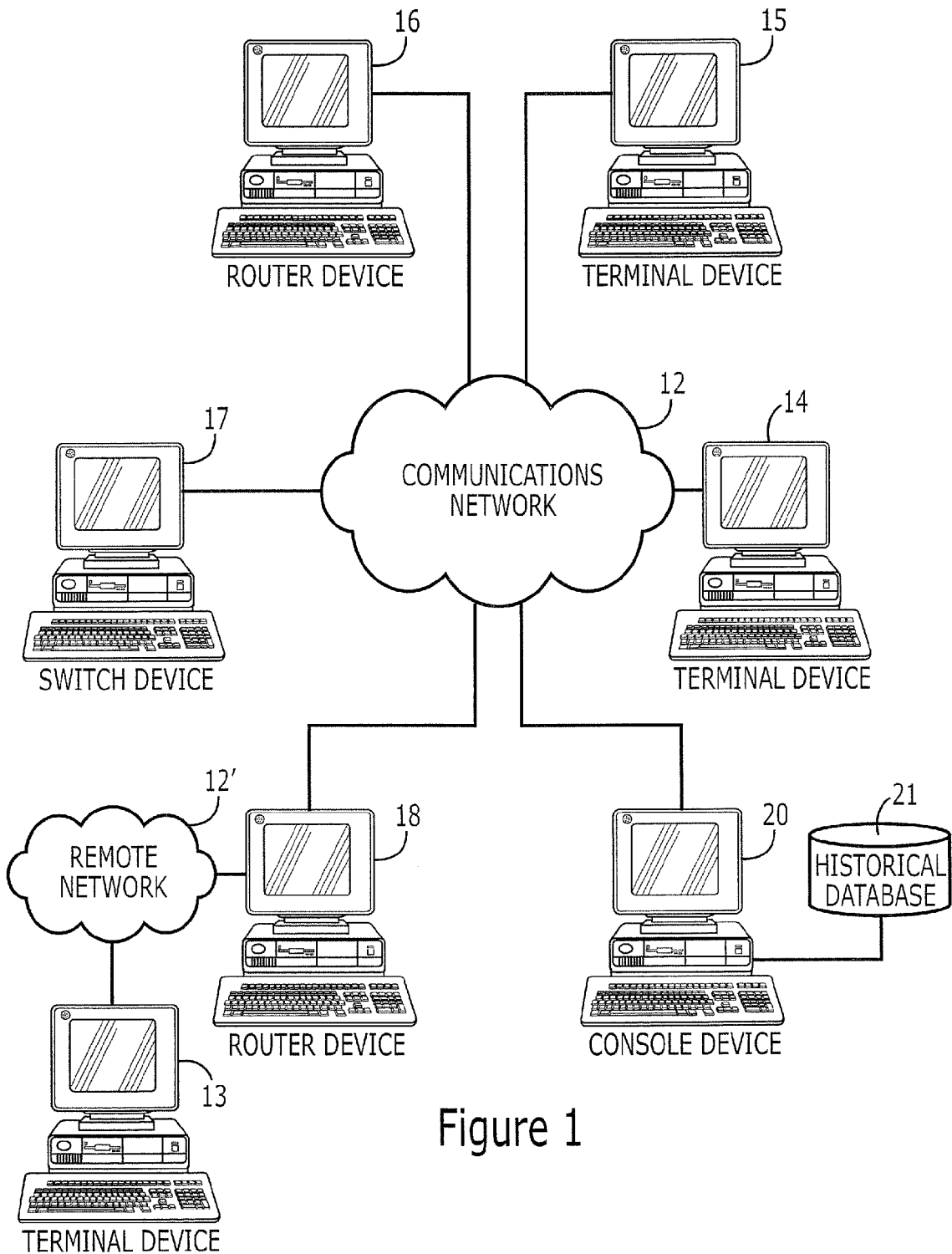
FIG. 1 is a block diagram of a hardware and software environment in which the present invention may operate according to some embodiments of the present invention.

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit" or "module." Furthermore, the present invention may take the form of a computer program product on a computer usable storage medium having computer-usable program code means embodied in the medium. Any suitable computer readable medium may be utilized including hard disks, CD-ROMs, optical storage devices, or magnetic storage devices.

Computer program code for carrying out operations of the present invention may be written in an object oriented programming language such as Java® or C++. However, the computer program code for carrying out operations of the present invention may also be written in conventional procedural programming languages, such as the "C" programming language or assembly language. The program code may execute entirely on the user's computer, partly on the user's computer, as a stand alone software package, partly on the user's computer and partly on a remote computer, or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the acts specified in the flowchart and/or block diagram block or blocks.

According to some embodiments of the present invention, in order to bring the proper visibility to IT process management, a process dashboard according to some embodiments of the present invention may be provided. A process dashboard may include information regarding the timeliness of policy execution, such as incident investigation/remediation, or change resolution. For example, comparison to relevant helpdesk service level agreements (SLAs), so as to manage the process of complying with those SLAs and the breakdown of time spent in each state/in each area of responsibility, to surface bottlenecks and difficulties in process execution for attention.

In further embodiments of the present invention, the process dashboard may further include information regarding commonalities among the instances being processed, for example, repeated occurrences of the same or similar types of instances (incidents, changes, etc.) so as to make special cases out of these, handling them more efficiently, for example, with more automation, to reduce the overall load and instances that are related through identical or similar successful remediation, allowing a deeper understanding of the relationship between these instances and the means by which they may be prevented or more efficiently handled as mentioned above.

In still further embodiments of the present invention, the process dashboard may further include comparison of policy execution metrics over time, for example, trend line of load, response times, remediation success, comparison with external service metrics, when available and allow management of continuous refinement of processes quality In some embodiments of the present invention, the process dashboard may further include knowledge-related metrics, which provide for focus on and success in building up site-specific knowledge, contributing to the above-described improvements. For example, how much knowledge is being accumulated, instances that include confirmation or denial of relationships between initial indicators and subsequent data collection, instances that reflect successful remediation and instances that include detailed comments regarding investigation and/or remediation. Also, how often pre-existing knowledge is being accessed as part of investigation and/or remediation efforts, how often it is indicated that existing knowledge successfully matched an instance, or assisted in the resolution of an instance and correlation of knowledge application to timeliness of resolution and/or success of remediation.

Thus, according to some embodiments of the present invention, methods, systems and computer program products are provided for providing visibility into the effective execution of IT process policies, using software dashboard techniques, thereby possibly enabling management oversight of these activities, and empowering improvements in IT process design and execution.

According to some embodiments indications of IT configuration errors or processing difficulties are received from various installed monitoring instrumentation, and assist the help desk personnel in analyzing and remediating any problems. Additional data collection necessary to analyze the problem is automated, and historical records regarding the incident are maintained. The records may include a primary indication, additional data collected, a manual indication as to the actual relevance of the additional data collected, remediation steps attempted and/or success or failure of remediation.

Once any historical data is present, when a primary indication of an event arrives, and as additional data is collected, these items are compared to the available historical record, and matching conditions previously observed are made available to the analyst, which may speed up the analysis process based on prior experience.

After sufficient historical data has been collected to pinpoint reliable remediation steps for specific conditions, this history data can be used to select those specific conditions and automate the proper remediation.

Some embodiments of the present invention will now be described with respect to FIGS. 1 through 11 below. Embodiments of the present invention provide methods, systems and computer program products for managing information technology (IT) processes for a computer network.

Referring first to FIG. 1, a computer network and system for managing IT processes for a computer network according to some embodiments of the present invention will be further described. A hardware and software computer network on which the present invention can operate as shown in FIG. 1 will now be described. As shown in FIG. 1, a communications network 12 includes and provides a communication link between terminal devices 14, 15, router devices 16, 18, switch device 17 and console device 20. The terminal devices 14, 15 may, for example, support users accessing a variety of hardware and software resources of the computer network. The terminal devices 14, 15 may further provide resources for other users and/or may execute applications or agents of applications providing for monitoring resources on the computer network and providing data from such monitoring to a process management system of the present invention and/or carry out actions responsive to the process management system.

As will be understood by those having skill in the art, a communications network 12 may include of a plurality of separate linked physical communication networks, which, using a protocol such as the Internet protocol (IP), may appear to be a single seamless communications network to user application programs. For example, as illustrated in FIG. 1, remote network 12' and communications network 12 may both include a communication node through a port of the router device 18. Accordingly, additional terminal devices or router/switch devices (not shown) or a terminal device 13 on remote network 12' may be part of the computer network and made available for communications from devices on communications network 12. For some embodiments of the present invention, the network to be evaluated may be limited to the local and/or wide area network of a company or the like.

It is further to be understood that, while for illustration purposes in FIG. 1 communications network 12 is shown as a single network, it may be comprised of a plurality of separate interconnected physical networks, one or more of which may be managed according to some embodiments of the present invention. As illustrated in FIG. 1, the devices 13, 14, 15, 16, 17, 18, 20, 21 may reside on a computer. As illustrated by router device 18, a single computer may be coupled to multiple networks (12, 12').

Console node 20, or other means for managing IT processes for the computer network may obtain user input, for example, by keyed input to a computer terminal or through a passive monitor, to request and/or provide information related to network management and may be configured to provide operations as more fully described later herein. The console node 20 is shown as directly coupled to a historical database 21 containing knowledge of previous incidents on the computer network and the responsive processes triggered thereby and the results of those processes. However, the console device 20 may be coupled to the historical database 21, for example, over the communications network 12.

Figure 2:
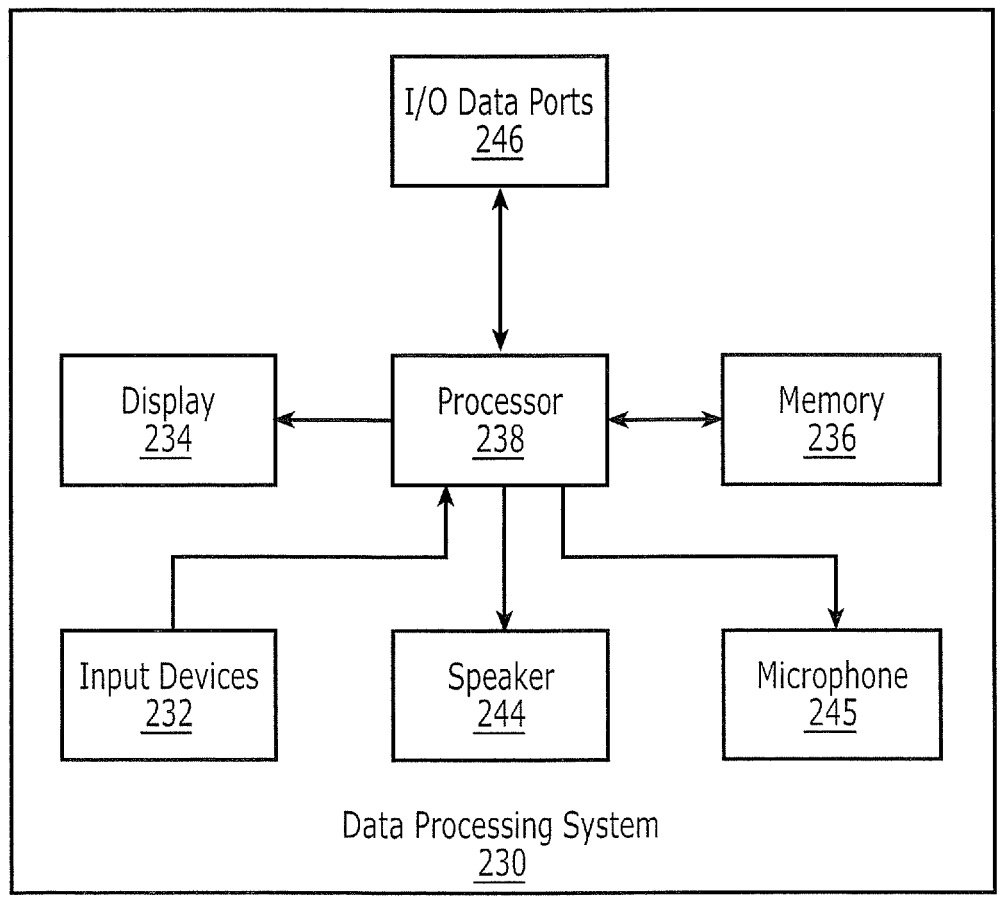
FIG. 2 is a block diagram of a data processing system according to some embodiments of the present invention.

FIG. 2 illustrates an exemplary embodiment of a data processing system 230 in accordance with some embodiments of the present invention. The data processing system 230 typically includes input device(s) 232, such as a keyboard or keypad, a display 234, and a memory 236 that communicate with a processor 238. The data processing system 230 may further include a speaker 244, a microphone 245 and I/O data port(s) 246 that also communicate with the processor 238. The I/O data ports 246 can be used to transfer information between the data processing system 230 and another computer system or a network 12, for example, using an internet protocol (IP) connection. These components may be conventional components, such as those used in many conventional data processing systems, which may be configured to operate as described herein.

Figure 3:
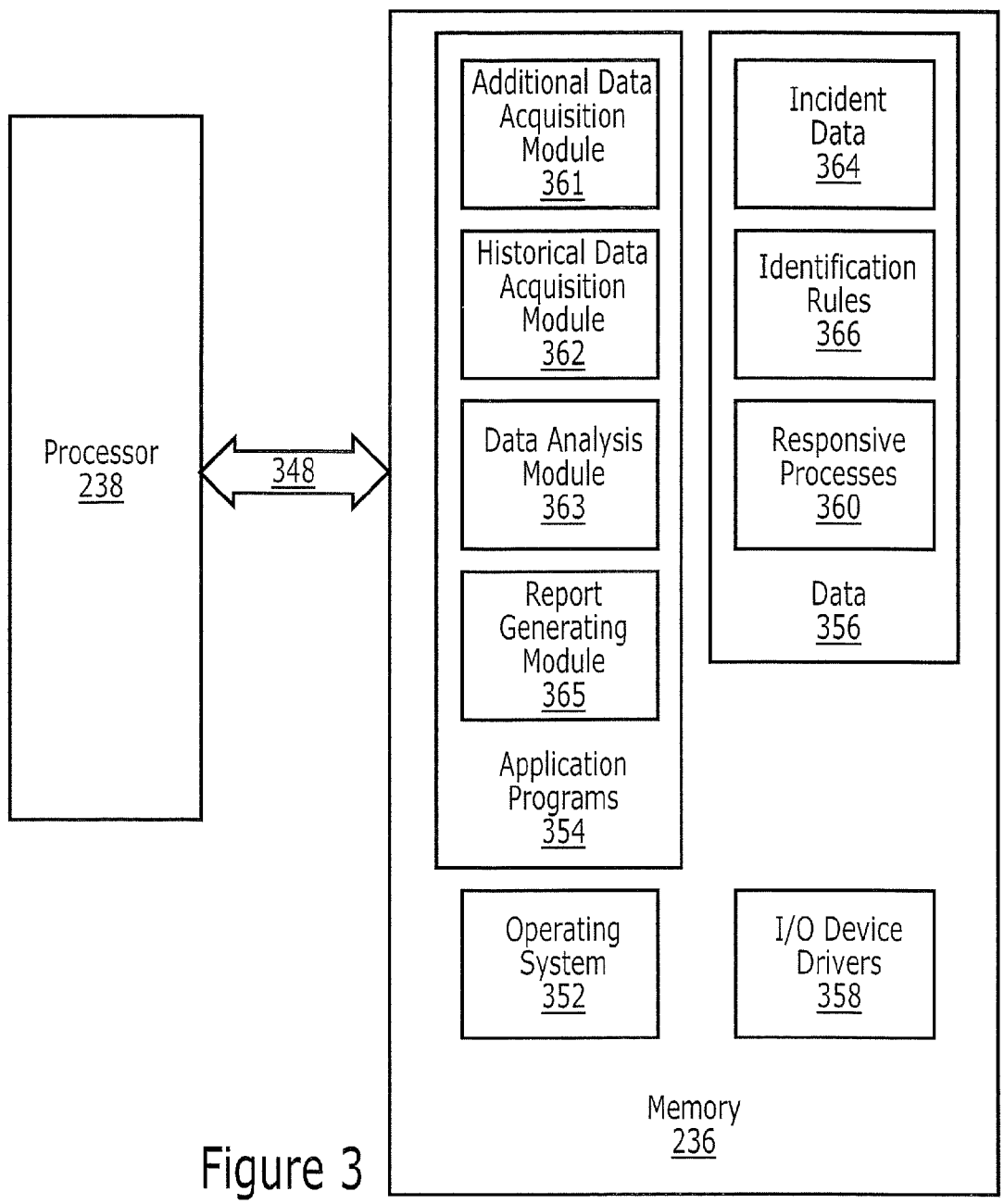
FIG. 3 is a more detailed block diagram of data processing systems for use in managing information technology (IT) processes for a computer network according to some embodiments of the present invention.

FIG. 3 is a block diagram of a data processing system that illustrates methods, systems and computer program products for managing IT processes for a computer network in accordance with some embodiments of the present invention. The processor 238 communicates with the memory 236 via an address/data bus 348. The processor 238 can be any commercially available or custom microprocessor. The memory 236 is representative of the overall hierarchy of memory devices containing the software and data used to implement the functionality of the data processing system 230. The memory 236 can include, but is not limited to, the following types of devices: cache, ROM, PROM, EPROM, EEPROM, flash memory, SRAM, and DRAM.

As shown in FIG. 3, the memory 236 may include several categories of software and data used in the data processing system 230: the operating system 352; the application programs 354; the input/output (I/O) device drivers 358; and the data 356. As will be appreciated by those of skill in the art, the operating system 352 may be any operating system suitable for use with a data processing system, such as Solaris from Sun Microsystems, OS/2, AIX or System390 from International Business Machines Corporation, Armonk, N.Y., Windows95, Windows98, Windows NT, Windows ME, Windows XP or Windows2000 from Microsoft Corporation, Redmond, Wash., Unix or Linux. The I/O device drivers 358 typically include software routines accessed through the operating system 352 by the application programs 354 to communicate with devices such as the input devices 232, the display 234, the speaker 244, the microphone 245, the I/O data port(s) 246, and certain memory 236 components. The application programs 354 are illustrative of the programs that implement the various features of the data processing system 230 and preferably include at least one application that supports operations according to embodiments of the present invention. Finally, the data 356 represents the static and dynamic data used by the application programs 354, the operating system 352, the I/O device drivers 358, and other software programs that may reside in the memory 236.

It will be understood that FIG. 3 illustrates a block diagram of data processing systems implementing a control device (console node) and/or other device for managing IT processes for a computer network according to some embodiments of the present invention. Thus, the application programs 354 and the data 356 discussed with respect to FIG. 3 may be located in the console device 20 although it may also be implemented on another device coupled to the computer network including the communications network 12 to be evaluated.

As illustrated in the embodiments of FIG. 3, the application programs 354 may include an additional data acquisition module 361, a historical data acquisition module 362, a data analysis module 363 and a user report generating module 365. The I/O device drivers 358 and I/O data ports 246 may be configured to provide a communication interface coupled to the network 12 that is configured to receive an incident report, which may have been generated by an application monitoring resources on a computer network. The incident report may include associated data regarding the nature of the incident. For example, an incident report may report on slow response time for a server based application service, where the incident is generated by a metric indicating violation of a service level agreement (SLA) related to the server based application.

The additional data acquisition module 361 may be configured to identify additional data associated with computer network resources to be obtained based on the incident report and to obtain the identified additional data. The historical data acquisition module 362 may be configured to identify related data in a historical database based on the incident report and/or the additional data and to retrieve the identified related historical data. The data analysis module 363 may be configured to analyze the incident report, the additional data and/or the related historical data to identify a responsive process to respond to the incident report.

Also shown in the embodiments of FIG. 3 is the user report generating module 365, which may be configured to provide the incident report, the additional data, the related historical data and/or identified responsive process to a network administrator of the managed computer network. As will be further described herein, the generated report may include a process dashboard graphical user interface (GUI), such as those illustrated in FIGS. 7-11. Such a process dashboard may provide information relating to an identification of timeliness of provision of ones of the monitored resources relative to a corresponding benchmark, a breakdown of time spent in respective ones of a plurality of states associated with provision of ones of the monitored resources (such as compliance and non-compliance), an identification of commonalities among the received incident report and other currently pending incident reports, a comparison of policy execution metrics over a selected period of time and/or a summary of accumulated data in the historical database including a correlation between initial indicators of incident causes and successful remediations, successful remediation instances, a level of usage of the accumulated data, a relation between the usage of the accumulated data and a performance measure of remediations and/or manually entered comments associated with remediation instances. Examples of such information displays are included in various of the illustrative GUIs of FIGS. 7-11.

The data 356 illustrated in the embodiments of FIG. 3 includes incident data 364, identification rules 366 and responsive processes 360, which may be utilized by the application programs 354 in accordance with various embodiments of the present invention. It will be further understood that the data 365 as described herein may be resident in the historical database 21 illustrated in FIG. 1. The incident data 364 may include historical data sorted by incident, including incident type, additional data collected with respect to such prior incidents, responsive processes carried out upon detection of the prior incident and the effectiveness of such responses.

The responsive processes 360 may include a plurality of responsive processes, each associated with respective incident report types. The identification rules 366 may include a plurality of rules for identifying ones of the responsive processes 360 based on a received incident report and/or additional data acquired in connection with such an incident report. It will be understood that multiple ones of the rules 366 may be used in response to receipt of an incident report and that a plurality of candidate responsive processes may be identified and presented to a network administrator for selection in some embodiments of the present invention as will be described more fully herein.

Figure 4:
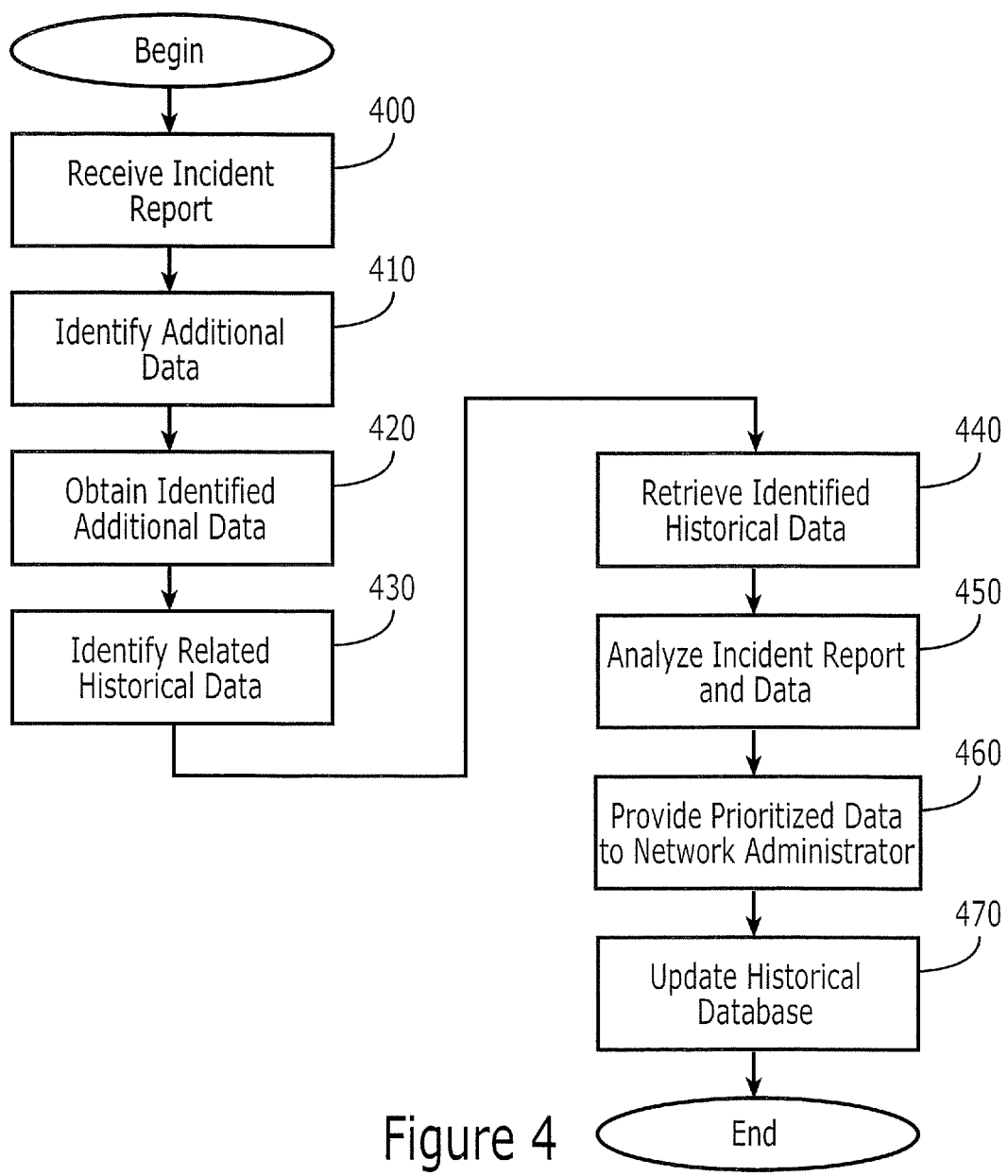
FIGS. 4-5 are flowcharts illustrating operations for managing information technology (IT) processes for a computer network according to some embodiments of the present invention.

Operations for managing IT processes for a communication network according to some embodiments of the present invention will now be further described with reference to the flowchart illustrations of FIGS. 4 and 5. Referring first to FIG. 4, operations begin at block 400 by receiving an incident report, including associated data, from an application monitoring resources on the computer network. It will be understood that a plurality of different applications may be monitoring resources on the computer network. For example, the applications monitoring resources may include an application manager, a security manager and/or a vulnerability manager, such as those available from NetIQ Corporation of Houston, Tex. Each of the applications monitoring resources on the computer network may operate using its own protocols for monitoring, communications and resources identification, which protocols may be developed separately for the respective applications. The incident report received at block 400 may be a variety of different types of incident reports associated with managing resources on a computer network as will be understood by those of ordinary skill in the art, such as detection of violation of a service level agreement (SLA).

Additional data associated with computer network resources that is to be obtained is automatically identified based on the received incident report (block 410). For example, slow response time to user requests submitted to a server based database resource may trigger collection of additional data related to performance and utilization of a shared resource data storage device coupled to the computer network that is utilized by the server based database resource. The identified additional data is automatically obtained (block 420).

Related data in a historical database is automatically identified based on the incident report and/or the additional data (block 430). Operations at block 430 may include identifying an indicator for the received incident report and identifying data associated with a previous incident reports in the historical database as related historical data based on the identified indicator. The related historical data may include an identification of additional data obtained for the previous incident reports and its relevance in remediation of the previous incident reports. Such information may provide guidance both for additional data that should be obtained and for responsive processes that may be likely to address the problem identified in the incident report. The historical data may further include an identification of responsive processes used in remediation of the previous incident reports and their success in remediation of the previous incident reports. The identified related historical data is automatically retrieved (block 440).

The incident report, the additional data and/or the related historical data are analyzed to identify a responsive process to respond to the incident report (block 450). In some embodiments, the historical database may be updated based on the incident report (block 470). Analyzing the incident report may include providing the incident report, the additional data, the related historical data and/or the identified responsive process to a network administrator in a prioritized ordering based on an evaluation of the relevance of the additional data in view of the related historical data (block 460). The provided information at block 460 may include a process dashboard GUT as described previously with reference to FIG. 3.

The updating of historical database at block 470 may be based on a determination of the effectiveness of the identified responsive process as will be described with reference to FIG. 5.

Further embodiments of the present invention will now be described with reference to the flowchart illustration of FIG. 5. FIG. 5 shows a variety of operations which may be carried out in various embodiments in connection with analyzing an incident report and providing data to a network administrator as referenced at blocks 450 and 460 of FIG. 4. Turning now to FIG. 5, operations begin by identifying at least one of a plurality of rules to be evaluated responsive to the received incident report (block 500). An identified rule is evaluated (block 510). If more rules remain for consideration responsive to the type of the received incident report (block 515), operations at block 500 and 510 repeat for the respective rules to be evaluated.

For the embodiments illustrated in FIG. 5, it is further determined if an identified responsive process, which process may be identified by evaluating the rules as described with reference to block 510, includes an associated automated remediation process (block 520). If so, the associated automated remediation process is automatically executed (block 530). If not (block 520), or if both automated and non-automated aspects are identified, the incident report, the additional data, the related historical data and/or the identified responsive process is provided to a network administrator in a prioritized ordering based on an evaluation of the relevance of the additional data in view of the related historical data (block 540). Thus, the report provided at block 540 may include, for example, reporting the identification of additional data obtained for previous incident reports and its relevance in remediation of the previous incident reports and the identification of responsive processes used in remediation of the previous incident reports and their success in remediation of the previous incident reports. A selection of one of a plurality of alternative responsive processes may be received from the administrator in some embodiments where a plurality of alternative candidate responsive processes are proposed to the network administrator (block 550). The selected responsive process is executed (block 560).

An effectiveness of the identified responsive process or processes in addressing the incident report is determined (block 570). This determined effectiveness may be utilized in updating the historical database as described with reference to block 470 of FIG. 4. In some embodiments, determining the effectiveness of the process or processes used to remediate the incident report includes executing an automated network health check process for the computer network. The automated network health check process may include obtaining data associated with a network resource identified in the incident report after the identified responsive process or processes have been executed. Furthermore, as noted above, the historical database may include a plurality of responsive processes associated with suspected incident report types as well as a plurality of rules for identifying ones of the candidate responsive processes based on the incident report and/or additional data. Operations related to updating the historical database in some embodiments include modifying one or more of the plurality of responsive processes that is associated with an incident report type and/or one or more of the rules used in selecting candidate responsive processes based on the effectiveness of the identified responsive process is determined at block 570.

Figure 6:
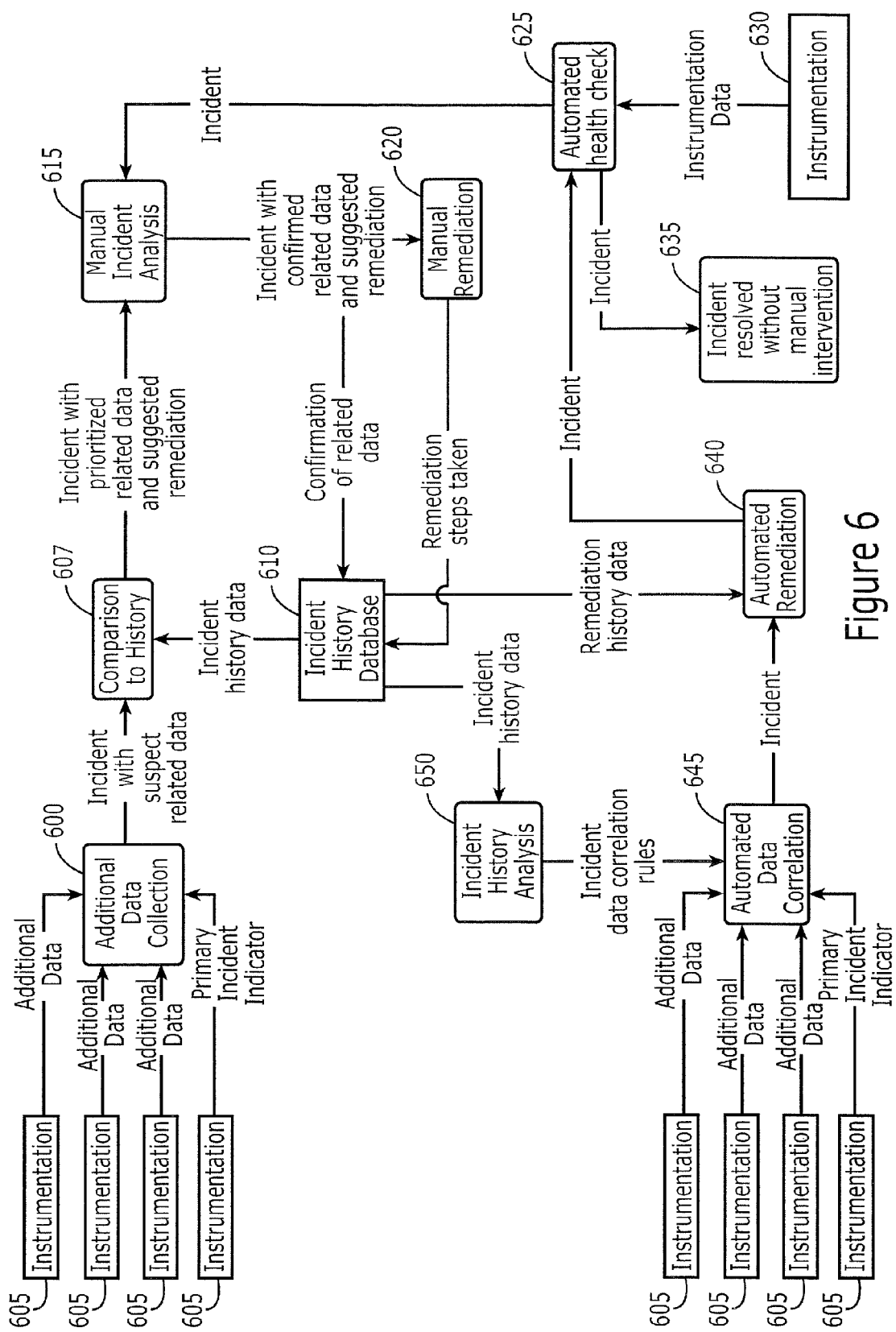
FIG. 6 is a data flow block diagram for managing IT processes for a computer network according to some embodiments of the present invention.

Data flows associated with operations for managing IT processes according to some embodiments of the present invention will now be further described with reference to the data flow diagram of FIG. 6. As shown in the embodiments of FIG. 6, data related to computer network resources and/or incident reports may be obtained from instrumentation 605, 630, which instrumentation may be part of and/or managed by an application program monitoring resources on the computer network. As seen in the embodiments of FIG. 6, as primary incident indicators or incident reports are received from the measurement instrumentation 605, an additional data collection process 600 may automate the collection of additional data points from the same or other instrumentation points that may be related, based, for example, on the resource or resource group where the primary indicator (report) originated. Furthermore, if history is available, the history comparison process 607 may compare the current incident to this history in the incident history database 610 looking for similar indicators. Past history regarding similar incidents may then be associated with the current incident, including what additional data was or was not relevant in prior incidents, as well as remediation attempted and their success.

Help desk staff or their supporting tiers may analyze available data as indicated by the manual incident analysis process 615. The available data may include the primary incident indicator, additional collected data, historical data, including the following for prior similar incidents, a primary incident indicator, additional collected data, including a confirmation or denial of relationship to the incident, prior remediation attempts and successes and the like. The analyst(s) may indicate which of the current additional data points are related to this incident, which is added to the Incident History Database for the current incident.

In addition, the analysts or other administrators may implement appropriate remediation steps as indicated by the manual remediation process 620, which remediation steps may be recorded in the incident history database 610 in connection with the current incident, along with indications as to the success or failure of the used remediation steps. Given sufficient history, specific incident types can be isolated and correlation rules can be created to select those specific incidents from the data coming from the instrumentation as indicated by the incident history analysis process 650. Using the correlation rules defined by the process 650, incoming data from the instrumentation 605 may be monitored and/or queried to isolate specific instances of the known types for which automated remediation is available as indicated by the automated data correlation process 645. When such incidents are located, automated remediation can be implemented, based on the history of such prior events, as indicated by the automated remediation process 640.

An automated health check can be used to gather current data regarding the resources in question, to determine whether the automatic incident remediation has been effective or not, as indicated by the automated health check process 625. If it has been effective, then the incident may be considered as fully remediated without manual intervention as indicated by the process block 635. Otherwise, the incident can rejoin the manual process 615 for manual analysis and remediation.

Process dashboard GUIs according to various embodiments of the present invention will now be further described with reference to the schematic illustrations of FIGS. 7-11. A related incident GUT is illustrated in FIG. 7. As seen in FIG. 7, the related incident GUI includes an identification field 710 for the incident ticket number. In addition, an incident summary field 720 is provided including various identification information related to the current incident. A related incident field 730 includes information that analysis has indicated corresponds to incidents related to the incident identified in the incident summary field 720.

Figure 8:
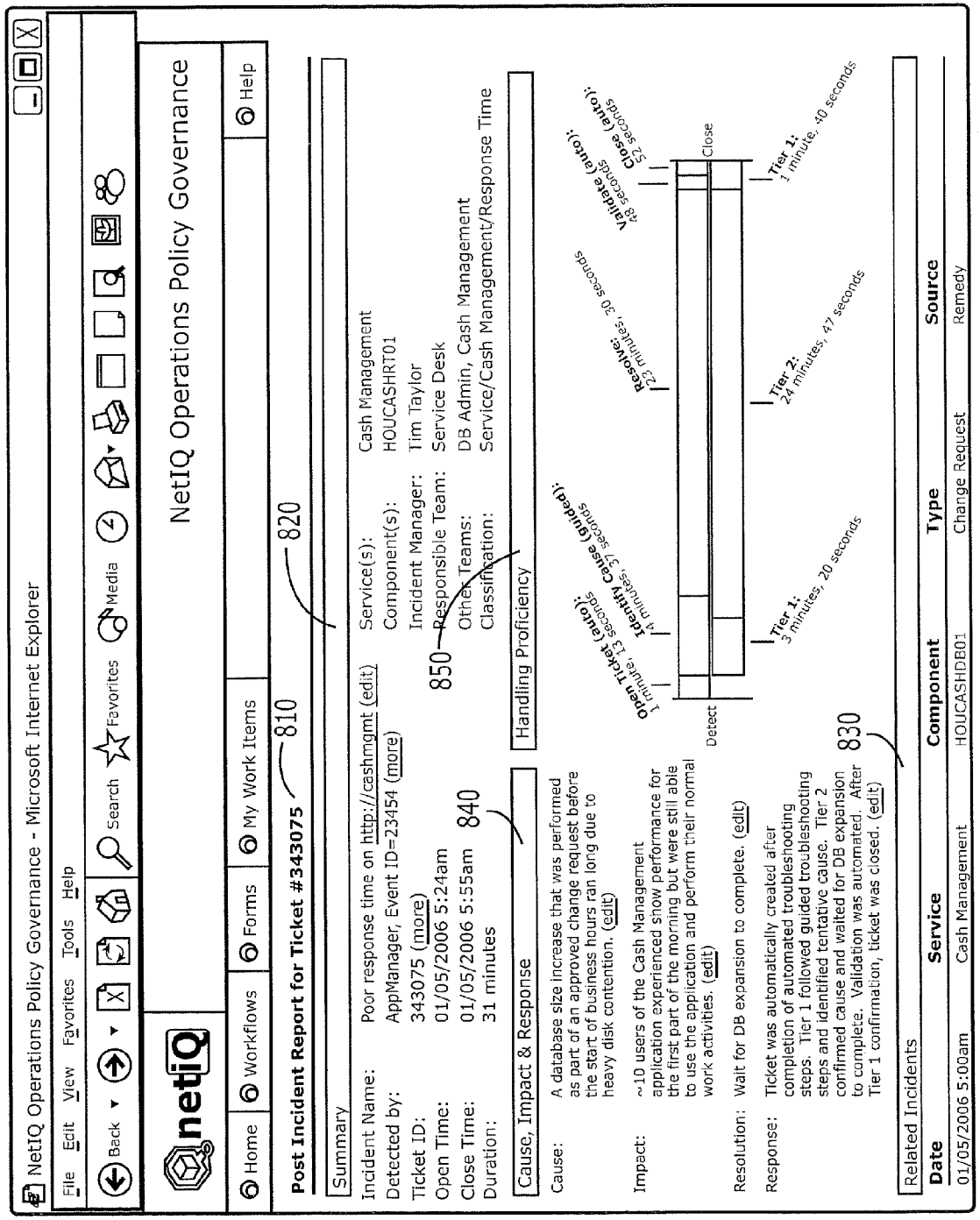

FIG. 8 illustrates a post-incident report GUI according to some embodiments. Again, an incident identification field 810 is included with a ticket number corresponding to the current incident report. An incident report summary field 820 includes summary information generated after closing of the incident report. The cause, impact & response field 840 includes further analysis textual information and the handling proficiency field 850 includes further graphically presented information. Finally, a related incidents field 830 is shown, corresponding to the related incidents field 730 of FIG. 7.

Figure 9:
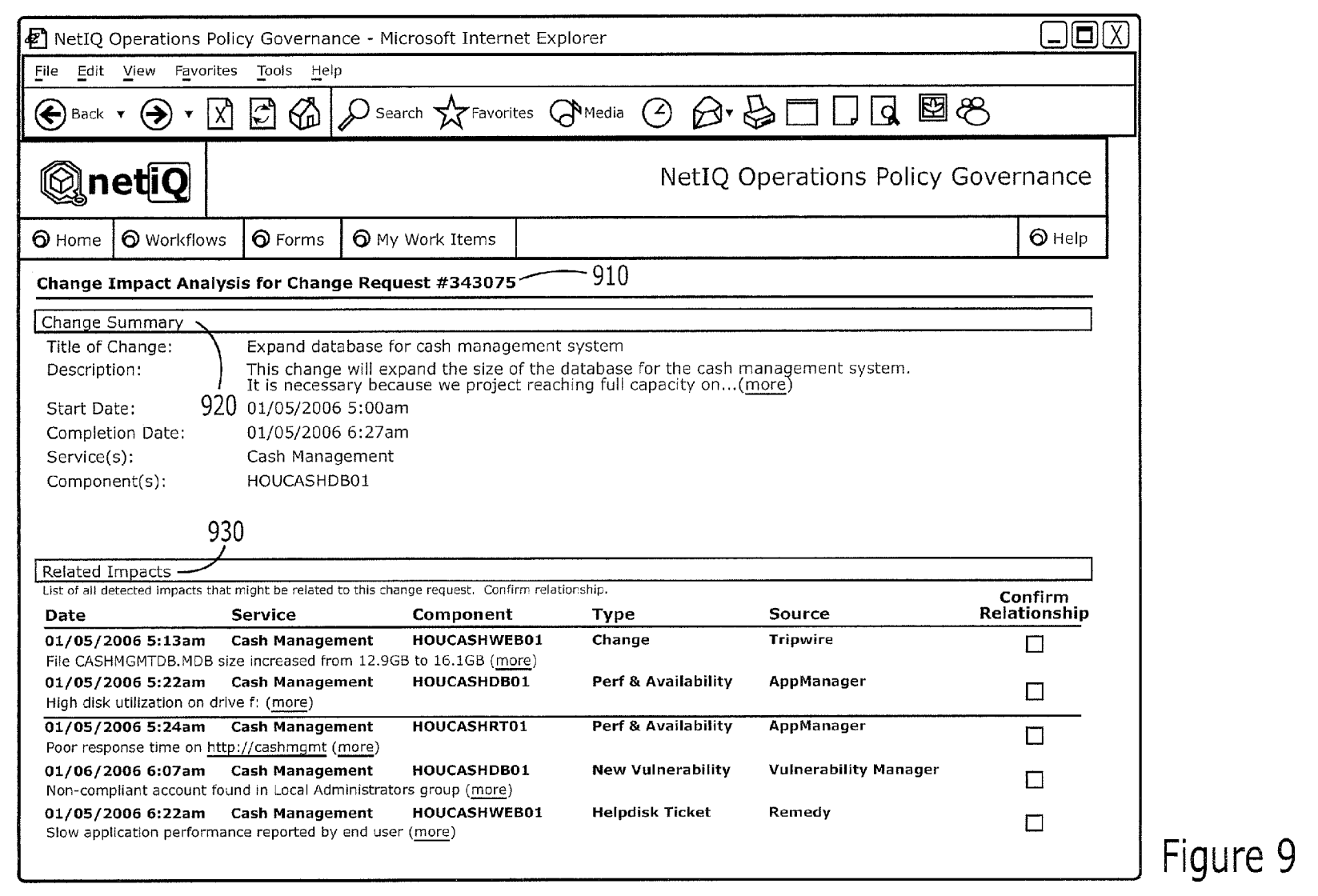

A change impact analysis GUT is illustrated in FIG. 9. An incident impact analysis identification field 910 is provided, as well as a change summary field 920 including various related information for the change whose impact analysis is being presented. Finally, a related impact field 930 is provided identifying all detected impacts that might be related to the change summarized in the GUT of FIG. 9.

Figure 10:
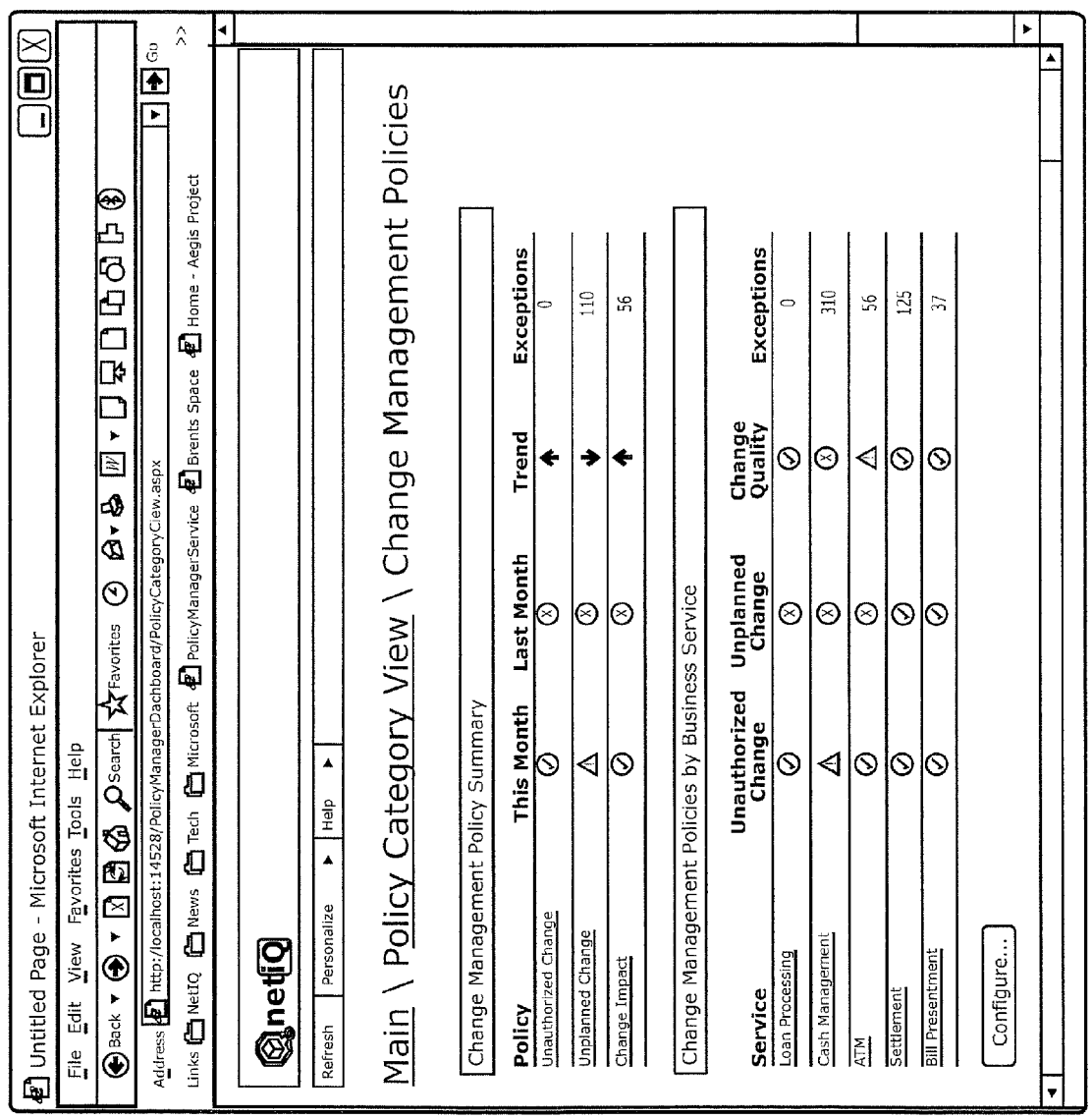
Figure 11:
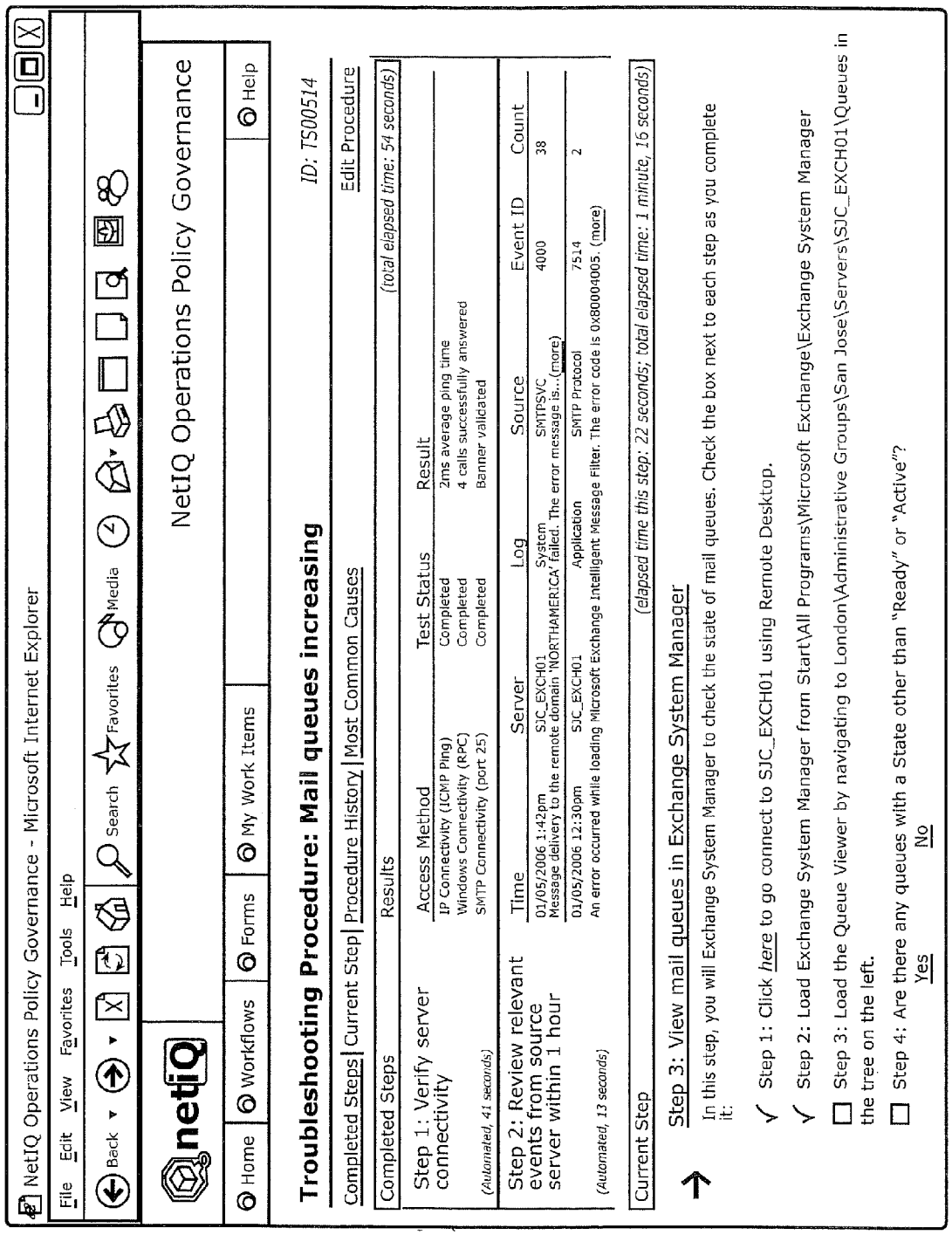

A change policy compliance GUI is illustrated in FIG. 10, which indicates graphically various time information related to change management policy in a summary and business service specific format. Finally, FIG. 11 illustrates a GUI disclosing portions of an identified trouble shooting procedure referred to as "Mail queues increasing." The GUI of FIG. 11 includes summary result information for completed steps and detailed information related to a step currently in process, shown as step 3 in the GUI of FIG. 11. It will be understood that the GUIs in FIG. 7-11 are presented for illustrative purposes only and shall not be considered limiting of the process and/or graphical user interfaces utilized in accordance with some embodiments of the present invention.

In accordance with various embodiments of the present invention, the definition of I/T processes (such as ITIL processes) as work flows that can be executed by a work flow engine, with supporting data structures and historical information regarding process execution, can provide better transparency of policy execution for better coordination of policy execution by various corporate actors in supporting more efficient execution of policy as individual experience becomes corporate experience over time. Furthermore, such may allow for analysis of process execution, including what parts of the process are running smoothly versus where the process is breaking down, what modification or specializations could be made to the defined processes, to handle special cases more easily, how successful a policy is of remediating issues and how policy execution is improving or degrading over time. In addition, discoveries of opportunities for process improvements may be provided, including what parts of the process could be further automated and what changes to configurations could reduce or eliminate problems.

In addition, the creation of an IT management "data bus" that can connect various I/T management tools from various vendors to the workflow engine may allow data provided by the monitoring tools to kick off process execution, support automatic collection of potentially relevant data from other tools, support automation or the corrective action that was originally done manually through these tools and/or support automatic post incident data collection and analysis to ensure that remediation was successful without side effects, which may be very important once a correction action has been automated so that if the automated corrective action fails to resolve the issue, response may be provided without delay manually.

In some embodiments of the present invention, the creation of a process knowledge base, which records and codifies the personal experience associated with process execution, may support manual confirmation of the relevancy of associated data, aided by application of historical data when present, tracking of knowledge creation activity, so such knowledge can be recognized as a corporate asset and managed as such and/or tracking of the relevancy of the knowledge base to ongoing incident resolution activities.

Thus, a management system according to some embodiments of the present invention may receive indications of IT configuration errors or processing difficulties from various installed monitoring instrumentation, and assist the help desk personnel in analyzing and remediating the problem. The system may automate additional data collection necessary to analyze the problem and maintain historical records regarding the incidents, including, primary indication, additional data collected, manual indication as to the actual relevancy of the additional data collected, remediation steps attempted and success or failure of the remediation.

Once any historical data is present, when a primary indication of an event arrives and as additional data is collected, these items are compared to the available historical record and matching conditions previously observed or made available to the analyst to further speed the analysis process based on prior experience. After sufficient historical data has been collected to pinpoint reliable remediation steps for specific conditions, this history data can be used to select those specific conditions and automate the proper remediation.

Still further embodiments of the present invention provide methods, systems and computer program products for analyzing and resolving IT process issues automatically. In some embodiments of the present invention, IT process exceptions are recognized based on specific events or combinations of events that have been reported by various IT infrastructure and application monitoring tools. Each such specific event or set of events may indicate a specific type of exceptional condition, such as hardware and software failures, over-utilized resources and/or slow response times. When an exceptional condition is so identified, some embodiments of the invention queries all other available monitoring tools for additional information regarding the resource or system that reported the initial exceptional condition, and presents all this data to the analyst, who studies the issue and confirms or denies relationships between the initial condition and the additionally collected data. The analyst further notes his explanation of the incident and the proper steps for resolution. After the resolution steps are completed, the system once again gathers data from all available monitoring tools to confirm that resolution has occurred.

As this system is repeatedly executed to resolve a wide range of exceptional conditions, many of which are recurrences of identical or similar conditions over time, the system builds tip a database of condition types, confirmed related data, analyst explanation, and recommended remediation steps. This database represents knowledge regarding IT process execution in the current environment, and can be used in several ways.

For example, as analysts see new instances of exceptional conditions, or similar exceptional conditions to those that have occurred in the past, the system can easily provide this prior knowledge to the analyst, so that he does not reproduce prior analysis efforts, but learns directly from them. Furthermore, in many cases, what are initially very general rules for finding exceptional conditions can be "fine-tuned." General rules tend to find many related conditions which are not all quite the same, but vary somewhat in their cause and remediation. By "fine-tuning" the rules used to detect exceptional conditions, the process of analysis can be further streamlined, and automation of remediation can become possible. Confirmed relationships between the initially identified event or events and subsequently collected data can be used to perform such fine-tuning, and the invention can thereby automatically categorize exceptional conditions with more accuracy, based on the presence or absence of such additional data. Once the knowledge of related additional data is so applied, analysis may be faster and, given sufficient fine-tuning so that only one specific exceptional condition can be identified, automatic resolution can be structured.

Given sufficient fine-tuning of exceptional condition identification as described above, the stored knowledge of the remediation steps which have been successful can be applied in an automatic manner. If such remediation steps have been taken manually, then the automation of such steps may include some manual assistance, for example, in supplying scripts which can effect the desired remediation. On the other hand, if remediation steps have implemented according to some embodiments of the present invention, then the stored knowledge associated with this type of exceptional condition may be fully automated without further manual assistance.

Thus, according to some embodiments of the present invention, methods systems and computer program products may be provided for assisting in the execution of IT process execution, recording of the steps and results of that process, making the knowledge so Teamed easily accessible to others performing similar tasks currently or in the future, and/or automating some or all of the steps involved in executing these processes. Thus, steps that were exclusively manual steps used to analyze and resolve IT process issues can be learned and automated by methods systems and computer program products according to some embodiments of the present invention. Accordingly, some embodiments of the present invention may provide for assistance with, and eventual automation of many of these manual steps, thereby improving the efficiency and lowering the costs associated with execution of the processes involved in the management of an IT operation.

The creation of the IT process knowledge base according to some embodiments of the present invention may allow the IT analyst to obtain prior knowledge regarding analysis and remediation of exceptional conditions is not lost, and need not be recreated. Furthermore, exception recognition may be easily "fine-tuned" based on prior confirmation of related data items, which may further lower the requirements for future analysis and remediation planning. In some cases, sufficient fine-tuning as described above can allow for automation of some or all of the required remediation steps. Taken together, these benefits may provide for relatively greater efficiency in the process of managing an IT operation, reduce costs as well as the time to resolution of exceptional conditions, restore fill service, and lower risk of future service outages.

It will be understood that IT analysts may need to alter the way in which they perform their duties, using embodiments of the present invention rather than performing all steps manually. Thus, there may be a learning curve and associated costs with changing the way in which these duties are performed. Once this learning curve has been overcome, the benefits identified above may accrue.

Accordingly, some embodiments of the present invention may provide methods, systems and computer program products that collect additional information automatically, ask for confirmation of relevancy, and store this information, along with description of both problem and remediation steps. Some embodiments of the present invention use such data to improve the efficiency of IT process management through provision of prior knowledge, fine-tuning of exceptional condition recognition, and automation of remediation steps.

It will be understood that the block diagrams of FIGS. 1-3 and combinations of blocks in the block diagrams may be implemented using discrete and integrated electronic circuits. It will also be appreciated that blocks of the block diagrams of FIGS. 1-3 and combinations of blocks in the block diagrams may be implemented using components other than those illustrated in FIGS. 1-3, and that, in general, various blocks of the block diagrams and combinations of blocks in the block diagrams, may be implemented in special purpose hardware such as discrete analog and/or digital circuitry, combinations of integrated circuits or one or more application specific integrated circuits (ASICs).

Figure 5:
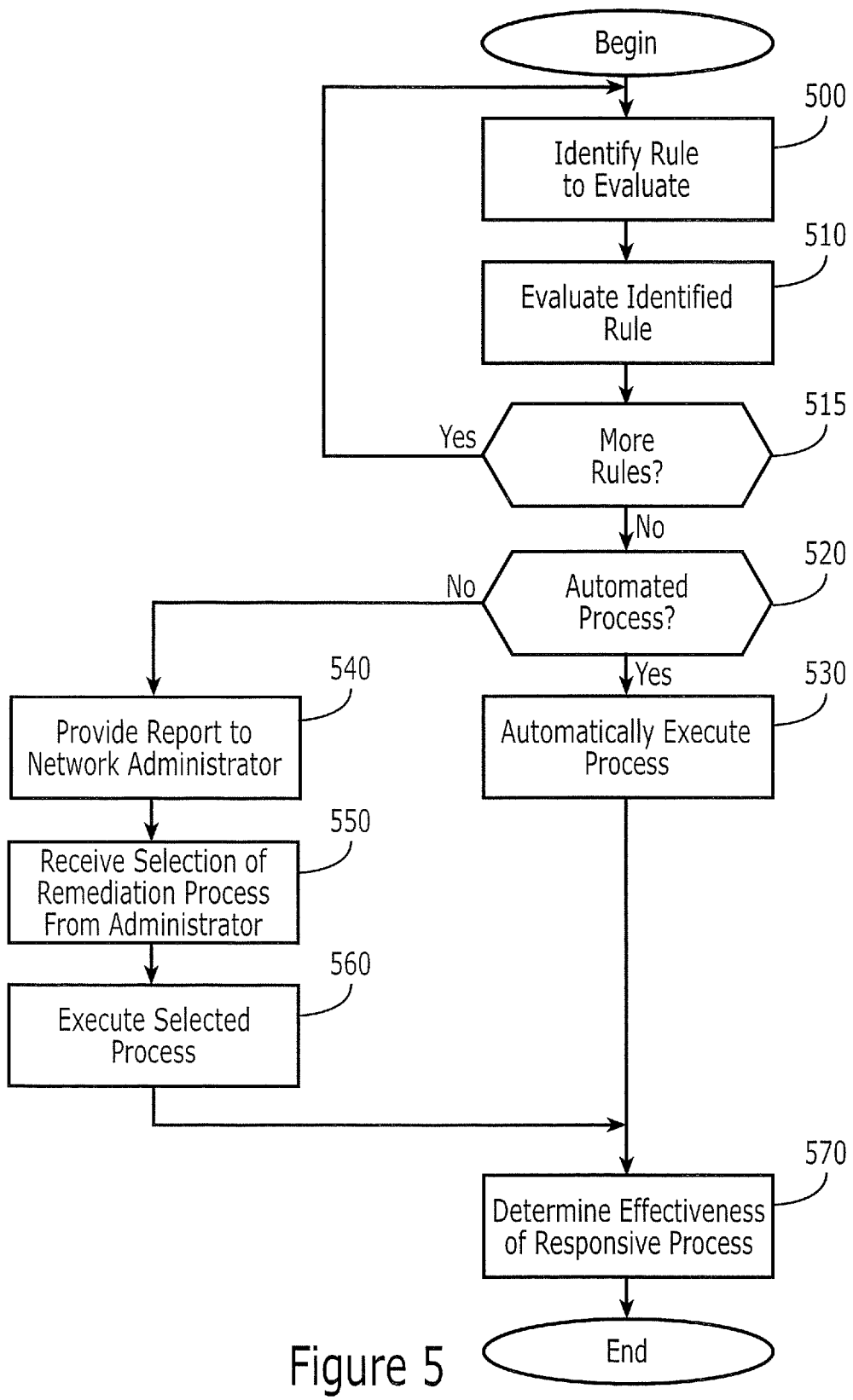

Accordingly, blocks of the block diagrams of FIGS. 1-3 and the flowcharts of FIGS. 4-6 support electronic circuits and other means for performing the specified operations, as well as combinations of operations. It will be understood that the circuits and other means supported by each block and combinations of blocks can be implemented by special purpose hardware, software or firmware operating on special or general purpose data processors, or combinations thereof. It should also be noted that, in some implementations, the operations noted in the blocks may occur out of the order noted in the figures. For example, two blocks shown in succession may, in fact, be executed substantially concurrently, or the blocks may sometimes be executed in the reverse order.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A method for managing information technology (IT) processes for a computer network that includes a plurality of applications monitoring resources on the computer network, the method comprising:

receiving an incident report, including associated data, from a first one of the applications monitoring resources on the computer network, wherein the incident report is associated with an identified one of a plurality of resources on the computer network and wherein the incident report is generated without input from any user to the first one of the applications monitoring resources on the computer network;

automatically identifying additional data associated with the identified one of the resources on the computer network to be collected based on the incident report;

automatically collecting the identified additional data directly from a different one of the applications monitoring resources on the computer network responsive to identifying the additional data, wherein the additional data is generated by the different one of the applications monitoring resources on the computer network without input from any user;

automatically identifying related data in a historical database based on the incident report and/or the additional data;

automatically retrieving the identified related historical data; and analyzing the incident report, the additional data and/or the related historical data to identify a responsive process to respond to the incident report.

2. The method of claim 1, wherein automatically collecting the identified additional data includes collecting the additional data directly from a plurality of different ones of the applications monitoring resources on the computer network and wherein the first one of the applications monitoring resources on the computer comprises an application manager and the plurality of different ones of the applications monitoring resources on the computer network includes a security manager.

3. The method of claim 1, wherein the plurality of applications monitoring resources include an application manager, a security manager and/or a vulnerability manager and wherein the incident report comprises a violation of a service level agreement.

4. The method of claim 1, wherein receiving an incident report is followed by updating the historical database based on the incident report.

5. The method of claim 1, wherein analyzing the incident report comprises providing the incident report, the additional data, the related historical data and/or the identified responsive process to a network administrator in a prioritized ordering based on an evaluation of the relevance of the additional data in view of the related historical data.

6. The method of claim 5, wherein providing the incident report, the additional data, the related historical data and/or the identified responsive process to the network administrator includes generating a process dashboard graphical user interface (GUI) including:

an identification of timeliness of provision of ones of the monitored resources relative to a corresponding benchmark; and/or a breakdown of time spent in respective ones of a plurality of states associated with provision of the ones of the monitored resources, wherein generating the process dashboard GUI further includes at least one of generating:
an identification of commonalities among the received incident report and other currently pending incident reports;
a comparison of policy execution metrics over a selected period of time; or
a summary of accumulated data in the historical database including a correlation between initial indicators of incident causes and successful remediations, successful remediation instances, a level of usage of the accumulated data, a relation between the usage of the accumulated data and a performance measure of remediations and/or manually entered comments associated with remediation instances.

7. The method of claim 5, wherein providing the incident report in a prioritized order includes generating a dashboard graphical user interface (GUI) including a display of an incident summary generated responsive to the received incident report followed by a display of related incidents that are identified as related to the received incident report.

8. The method of claim 5, wherein providing the incident report in a prioritized order includes generating a dashboard graphical user interface (GUI) including a display of a change summary generated responsive to the received incident report followed by a display of related impacts that are identified as related to the change summary.

9. The method of claim 1, wherein the historical database includes a plurality of responsive processes associated with respective incident report types and a plurality of rules for identifying ones of the plurality of responsive processes based on the incident report and/or the additional data and wherein analyzing the incident report includes:
identifying at least one of the plurality of rules to be evaluated responsive to the received incident report; and
evaluating the identified at least one of the plurality of rules.

10. The method of claim 1, wherein analyzing the incident report comprises:
determining if the identified responsive process includes an associated automated remediation process;
providing the incident report, the additional data, the related historical data and/or the identified responsive process to a network administrator in a prioritized ordering based on an evaluation of the relevance of the additional data in view of the related historical data when the identified responsive process does not include an associated automated remediation process; and
automatically executing the associated automated remediation process when the identified responsive process does include an associated automated remediation process.

11. The method of claim 10, wherein analyzing the incident report includes automatically executing the associated automated remediation process.

12. The method of claim 10, wherein analyzing the incident report is followed by:
determining an effectiveness of the identified responsive process in addressing the incident report; and
updating the historical database based on the effectiveness of the identified responsive process, wherein the historical database includes a plurality of responsive processes associated with respective incident report types and a plurality of rules for identifying ones of the plurality of responsive processes based on the incident report and/or the additional data and wherein updating the historical database includes modifying at least one of the plurality of responsive processes that is associated with an incident report type of the received incident report and/or at least one of the plurality of rules based on the effectiveness of the identified responsive process.

13. The method of claim 12, wherein determining the effectiveness includes executing an automated network health check process for the computer network, the automated network health check process including collecting data associated with the identified one of the resources on the computer network after the identified responsive process has been executed.

14. The method of claim 13, wherein updating the historical database includes modifying at least one of the plurality of responsive processes that is associated with an incident report type of the received incident report.

15. The method of claim 14, wherein identifying the related data in the historical database comprises:
identifying an indicator for the received incident report; and
identifying data associated with previous incident reports in the historical database as related historical data based on the identified indicator, the related historical data including an identification of additional data obtained for the previous incident reports and its relevance in remediation of the previous incident reports and an identification of responsive processes used in remediation of the previous incident reports and their success in remediation of the previous incident reports.

16. The method of claim 15, wherein the identified responsive process comprises a plurality of alternative responsive processes and wherein analyzing the incident report includes reporting the identification of additional data obtained for the previous incident reports and its relevance in remediation of the previous incident reports and the identification of responsive processes used in remediation of the previous incident reports and their success in remediation of the previous incident reports to a network administrator and wherein the method further comprises receiving from the network administrator a selection of one of the plurality of alternative responsive processes.

17. The method of claim 16, wherein reporting the identification of additional data includes generating a process dashboard graphical user interface (GUI) including:
an identification of timeliness of provision of ones of the monitored resources relative to a corresponding benchmark;
a breakdown of time spent in respective ones of a plurality of states associated with provision of the ones of the monitored resources;
an identification of commonalities among the received incident report and other currently pending incident reports;
a comparison of policy execution metrics over a selected period of time; and/or
a summary of accumulated data in the historical database including a correlation between initial indicators of incident causes and successful remediations, successful remediation instances, a level of usage of the accumulated data, a relation between the usage of the accumulated data and a performance measure of remediations and/or manually entered comments associated with remediation instances.

18. A system comprising a data processing apparatus having computer program instructions loaded thereon that are configured to carry out the method of claim 15.

19. A computer program product for managing information technology (IT) processes for a computer network, the computer program product comprising computer program code embodied in a non-transitory computer readable medium, the computer program code comprising program code configured to carry out the method of claim 15.

20. The method of claim 1, wherein receiving an incident report comprises:
 receiving a plurality of incident reports;
 automatically identifying commonalities among the incident reports; and
 providing a special case status to ones of the incident reports with identified commonalities, and wherein analyzing the incident report includes analyzing the incident reports to identifying the responsive process based on the special case status of the incident reports.

21. The method of claim 1, wherein receiving the incident report comprises:
 receiving a report of slow response time for a server based application service;
 comparing the reported slow response time to a corresponding metric of a service level agreement (SLA) related to the server based application; and
 generating the incident report based on the comparison of the reported slow response time to the corresponding metric.

22. The method of claim 1, wherein the incident report is received from a first one of the resources resident on a first device on the computer network and wherein automatically identifying additional data includes automatically identifying additional data associated with a second one of the resources resident on a second device on the computer network, different from the first device, to be collected based on the incident report.

23. The method of claim 1, wherein the responsive process includes remediation operations to be carried out on at least two different devices on the computer network.

24. A computer system for managing information technology (IT) processes for a computer network that includes a plurality of applications monitoring resources on the computer network, the system comprising:
 a communication interface coupled to the computer network that is configured to receive an incident report, including associated data, from a first one of the applications monitoring resources on the computer network, wherein the incident report is associated with an identified one of the resources on the computer network and wherein the incident report is generated without input from any user to the first one of the applications monitoring resources on the computer network;
 an additional data acquisition module executing on a processor of the computer system configured to identify additional data associated with the identified one of the resources on the computer network to be collected based on the incident report and to collect the identified additional data directly from a different one of the applications monitoring resources on the computer network responsive to identifying the additional data, wherein the additional data is generated by the different one of the applications monitoring resources on the computer network without input from any user;
 a historical data acquisition module executing on a processor of the computer system configured to identify related data in a historical database based on the incident report and/or the additional data and to retrieve the identified related historical data; and
 a data analysis module executing on a processor of the computer system configured to analyze the incident report, the additional data and/or the related historical data to a identify a responsive process to respond to the incident report.

25. The system of claim 24, further comprising a user report generating module executing on a processor of the computer system configured to provide the incident report, the additional data, the related historical data and/or the identified responsive process to the network administrator, including generating a process dashboard graphical user interface (GUI) for display on a display of the computer system including:
 an identification of timeliness of provision of ones of the monitored resources relative to a corresponding benchmark; and/or
 a breakdown of time spent in respective ones of a plurality of states associated with provision of the ones of the monitored resources, wherein generating the process dashboard GUI further includes at least one of generating:
 an identification of commonalities among the received incident report and other currently pending incident reports;
 a comparison of policy execution metrics over a selected period of time; and/or
 a summary of accumulated data in the historical database including a correlation between initial indicators of incident causes and successful remediations, successful remediation instances, a level of usage of the accumulated data, a relation between the usage of the accumulated data and a performance measure of remediations and/or manually entered comments associated with remediation instances.

26. A computer program product for managing information technology (IT) processes for a computer network that includes a plurality of applications monitoring resources on the computer network, the computer program product comprising:
 a non-transitory computer-readable storage medium having computer-readable program code embodied in said medium, said computer-readable program code comprising:
 computer-readable program code that receives an incident report, including associated data, from a first one of the applications monitoring resources on the computer network, wherein the incident report is associated with an identified one of the resources on the computer network and wherein the incident report is generated without input from any user to the first one of the applications monitoring resources on the computer network;
 computer-readable program code that identifies additional data associated with the identified one of the resources on the computer network to be collected based on the incident report;
 computer-readable program code that collects the identified additional data directly from a different one of the applications monitoring resources on the computer network responsive to identifying the additional data, wherein the additional data is generated by the different one of the applications monitoring resources on the computer network without input from any user;
 computer-readable program code that identifies related data in a historical database based on the incident report and/or the additional data;
 computer-readable program code that retrieves the identified related historical data; and computer-readable program code that analyzes the incident report, the additional data and/or the related historical data to a identify a responsive process to respond to the incident report.

27. A method for managing information technology (IT) processes for a computer network that includes a plurality of applications monitoring resources on the computer network, the method comprising:

defining a plurality of exceptional events for the computer network, each of the defined plurality of exceptional events having an associated combination of detected events;

receiving a plurality of reports of detected events from ones of the plurality of applications monitoring resources on the computer network, wherein an incident report is generated without input from any user to a first one of the applications monitoring resources on the computer network;

comparing the plurality of reports of detected events to the associated combinations of detected events of the exceptional events to detect an occurrence of one of the exceptional events on the computer network, the plurality of reports of detected events including associated data;

identifying additional data associated with the resources on the computer network to be obtained based on detected occurrence of one of the exceptional events;

obtaining the identified additional data responsive to identifying the additional data, wherein the additional data is generated by a different one of the applications monitoring resources on the computer network without input from any user;

automatically identifying related data in a historical database based on the incident report and/or the additional data;

automatically retrieving the identified related historical data; and analyzing the plurality of reports of detected events including associated data, the additional data and/or the related historical data to identify a responsive process to respond to the incident report.

28. The method of claim 27, wherein the plurality of exceptional events includes hardware failures, software failures, over-utilized resources and slow response times.

29. The method of claim 27, wherein obtaining the identified additional data includes querying any of the plurality of application monitoring resources that did not provide any of the plurality of reports of detected events used to detect the occurrence of one of the exceptional events.

* * * * *

UNITED STATES PATENT AND TRADEMARK OFFICE
CERTIFICATE OF CORRECTION

PATENT NO.       : 8,504,679 B2  
APPLICATION NO.  : 11/744983  
DATED            : August 6, 2013  
INVENTOR(S)      : Spire et al.

Page 1 of 1

It is certified that error appears in the above-identified patent and that said Letters Patent is hereby corrected as shown below:

On Title Page:
Item (73), Assignee: Please correct "NetIQ Corporation, Houston, TX (US);"
to read -- NetIQ Corporation, Houston, TX (US); --

In the Claims:
Column 20, Claim 24, Line 4: Please correct "data to a identify a"
to read -- data to identify a --

Column 21, Claim 26, Line 3: Please correct "data to a identify a"
to read -- data to identify a --

Signed and Sealed this
Fourth Day of February, 2014

Michelle K. Lee
*Deputy Director of the United States Patent and Trademark Office*